US012671624B2

(12) United States Patent
Sabidur Rahman et al.

(10) Patent No.: US 12,671,624 B2
(45) Date of Patent: Jun. 30, 2026

(54) EXPOSING NETWORK KEY PERFORMANCE INDICATORS TO EXTERNAL CLIENTS VIA APPLICATION PROGRAMMING INTERFACES

(71) Applicant: AT&T Intellectual Property I, L.P., Atlanta, GA (US)

(72) Inventors: K M Sabidur Rahman, San Ramon, CA (US); Yali Liu, Dublin, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 88 days.

(21) Appl. No.: 18/773,424

(22) Filed: Jul. 15, 2024

(65) Prior Publication Data

US 2026/0019326 A1     Jan. 15, 2026

(51) Int. Cl.
*H04L 41/08* (2022.01)
*G06F 9/54* (2006.01)

(52) U.S. Cl.
CPC .............. *H04L 41/08* (2013.01); *G06F 9/547* (2013.01)

(58) Field of Classification Search
None
See application file for complete search history.

(56) References Cited

U.S. PATENT DOCUMENTS

| | | | | |
|---|---|---|---|---|
| 2005/0223021 A1* | 10/2005 | Batra | ..................... | G06Q 10/00 |
| | | | | 707/999.102 |
| 2020/0351163 A1* | 11/2020 | Tabak | ..................... | H04L 67/60 |
| 2021/0194774 A1* | 6/2021 | Yang | ................... | H04L 41/5009 |
| 2023/0016839 A1* | 1/2023 | Malboubi | ........... | H04L 41/0895 |
| 2024/0114363 A1* | 4/2024 | Miguel | ................. | H04L 41/145 |
| 2024/0160893 A1* | 5/2024 | Tv | ........................... | G06N 3/045 |
| 2024/0171468 A1* | 5/2024 | Jain | ........................ | H04W 24/08 |
| 2025/0348775 A1* | 11/2025 | Ihalage | ................. | G06N 20/00 |

* cited by examiner

*Primary Examiner* — June Sison

(57) ABSTRACT

A method performed by a processing system including at least one processor includes calculating a first set of key performance indicators for a communications network based on data acquired from at least one source that is accessible to an operator of the communications network and publishing at least the first set of key performance indicators via an application programming interface that enables the operator of the communications network to share data with an external client of the communications network.

20 Claims, 3 Drawing Sheets

<u>200</u>

200

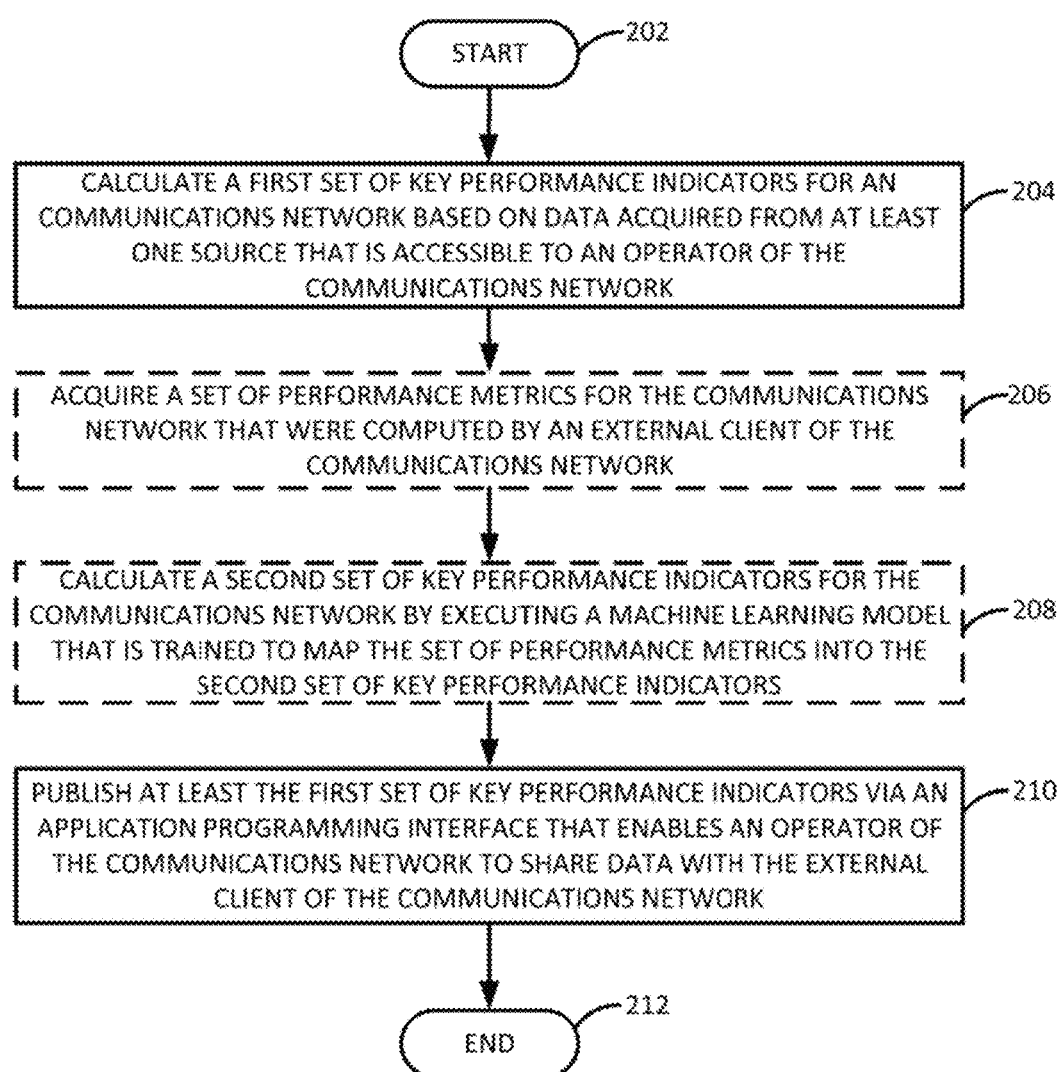

START ~202

CALCULATE A FIRST SET OF KEY PERFORMANCE INDICATORS FOR AN COMMUNICATIONS NETWORK BASED ON DATA ACQUIRED FROM AT LEAST ONE SOURCE THAT IS ACCESSIBLE TO AN OPERATOR OF THE COMMUNICATIONS NETWORK ~204

ACQUIRE A SET OF PERFORMANCE METRICS FOR THE COMMUNICATIONS NETWORK THAT WERE COMPUTED BY AN EXTERNAL CLIENT OF THE COMMUNICATIONS NETWORK ~206

CALCULATE A SECOND SET OF KEY PERFORMANCE INDICATORS FOR THE COMMUNICATIONS NETWORK BY EXECUTING A MACHINE LEARNING MODEL THAT IS TRAINED TO MAP THE SET OF PERFORMANCE METRICS INTO THE SECOND SET OF KEY PERFORMANCE INDICATORS ~208

PUBLISH AT LEAST THE FIRST SET OF KEY PERFORMANCE INDICATORS VIA AN APPLICATION PROGRAMMING INTERFACE THAT ENABLES AN OPERATOR OF THE COMMUNICATIONS NETWORK TO SHARE DATA WITH THE EXTERNAL CLIENT OF THE COMMUNICATIONS NETWORK ~210

END ~212

EXPOSING NETWORK KEY PERFORMANCE INDICATORS TO EXTERNAL CLIENTS VIA APPLICATION PROGRAMMING INTERFACES

The present disclosure relates generally to communications networks and relates more particularly to devices, non-transitory computer-readable media, and methods for exposing network key performance indicators to external clients via application programming interfaces.

BACKGROUND

Internet service providers (ISPs) are constantly monitoring network performance to ensure that the quality of service experienced by customers meets a promised or expected quality of service. Many existing methods of monitoring network service rely on the measurement of one or more network metrics, such as bandwidth usage, latency, packet loss, jitter, or the like. These network metrics are often referred to as "key performance indicators" or "KPIs."

SUMMARY

In one example, the present disclosure describes a device, computer-readable medium, and method for exposing network key performance indicators to external clients via application programming interfaces. For instance, in one example, a method performed by a processing system including at least one processor includes calculating a first set of key performance indicators for a communications network based on data acquired from at least one source that is accessible to an operator of the communications network and publishing at least the first set of key performance indicators via an application programming interface that enables the operator of the communications network to share data with an external client of the communications network.

In another example, a non-transitory computer-readable medium stores instructions which, when executed by a processor, cause the processor to perform operations. The operations include calculating a first set of key performance indicators for a communications network based on data acquired from at least one source that is accessible to an operator of the communications network and publishing at least the first set of key performance indicators via an application programming interface that enables the operator of the communications network to share data with an external client of the communications network.

In another example, a device includes a processor and a computer-readable medium storing instructions which, when executed by the processor, cause the processor to perform operations. The operations include calculating a first set of key performance indicators for a communications network based on data acquired from at least one source that is accessible to an operator of the communications network and publishing at least the first set of key performance indicators via an application programming interface that enables the operator of the communications network to share data with an external client of the communications network.

BRIEF DESCRIPTION OF THE DRAWINGS

The teachings of the present disclosure can be readily understood by considering the following detailed description in conjunction with the accompanying drawings, in which:

FIG. 2 illustrates a flowchart of an example method for exposing network key performance indicators to external clients via application programming interfaces, in accordance with the present disclosure.

To facilitate understanding, identical reference numerals have been used, where possible, to designate identical elements that are common to the figures.

DETAILED DESCRIPTION

Figure 1:
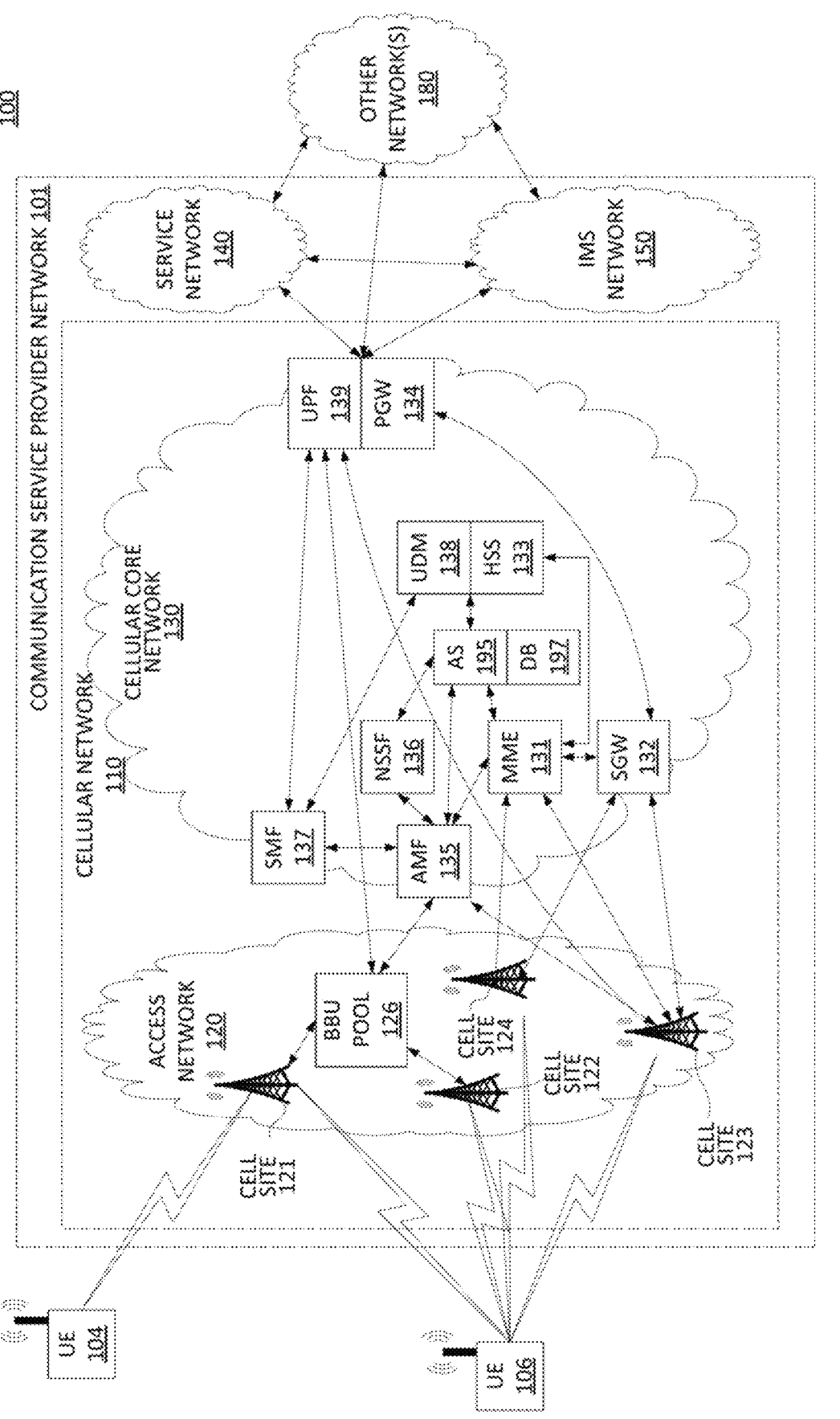
FIG. 1 illustrates an example network, or system, in which examples of the present disclosure may operate.

In one example, the present disclosure exposes network key performance indicators to external clients via application programming interfaces. As discussed above, Internet service providers (ISPs) are constantly monitoring network performance to ensure that the quality of service experienced by customers meets a promised or expected quality of service. Many existing methods of monitoring network service rely on the measurement of one or more network metrics, such as bandwidth usage, latency, packet loss, jitter, or the like. These network metrics are often referred to as "key performance indicators" or "KPIs."

ISPs may collect KPIs from a plurality of different sources, including flow cytometry analysis programs, event data records (EDRs) from long term evolution (LTE) networks, Fifth Generation (5G) standalone networks, and 5G non-standalone networks, speed test platforms, and other sources. Access to diverse data sources provides ISPs with a rich data set, including network measurement data collected from real users and real activities across a vast geographic area. This rich data set provides insights that can help ISPs to improve the quality of service experienced by customers.

On the other hand, external clients that rely on network connectivity, such as application developers, manufacturers of autonomous vehicles and Internet of Things devices, extended reality (e.g., augmented reality, virtual reality, and the like) application systems, and the like, typically do not have access to such a rich set of connectivity data. These external clients may have their own methods of measuring network performance (e.g., ping, speed test, or the like), but these methods tend not to be as accurate as the ISPs' methods due to the more limited data that is available for analysis.

Examples of the present disclosure provide application programming interfaces (APIs) via which an ISP may expose KPIs computed by the ISP to external clients who provide applications and services that rely on network connectivity. The external clients may use these KPIs computed by the ISP to improve the functioning of the applications and services. In further examples, the APIs may convert network performance metrics computed by the external clients into KPIs, which may enable the external clients to assess the performance of their applications and services in the ISP's network more accurately. For instance, metrics computed on the basis of application or service initiated pings or speed tests may be converted into measures of RAN throughput or latency.

Although examples of the present disclosure are discussed within the context of providing KPIs and related data to external clients of a communications network operator, it will be appreciated that the same techniques may also be used to provide KPI data to internal clients of the operator (e.g., network engineers, administrators, operations, and the like), who may have to consult many different data sources in order to obtain different statistics and analytics. These and other aspects of the present disclosure are discussed in greater detail in connection with FIGS. 1-3, below.

FIG. 1 illustrates an example network, or system, 100 in which examples of the present disclosure may operate. In one example, the system 100 includes a communication service provider network 101. The communication service provider network 101 may comprise a cellular network 110 (e.g., a 5G network, a 4G/Long Term Evolution (LTE)/5G hybrid network, or the like), a service network 140, and an IP Multimedia Subsystem (IMS) network 150. The system 100 may further include other networks 180 connected to the communication service provider network 101.

In one example, the cellular network 110 comprises an access network 120 and a cellular core network 130. In one example, the access network 120 comprises a radio access network (RAN), such as a cloud RAN, a distributed RAN (D-RAN), a centralized RAN (C-RAN), a virtualized RAN (V-RAN), or an open RAN (O-RAN). For instance, a cloud RAN is part of the 3GPP 5G specifications for mobile networks. As part of the migration of cellular networks towards 5G, a cloud RAN may be coupled to an Evolved Packet Core (EPC) network until new cellular core networks are deployed in accordance with 5G specifications. In one example, access network 120 may include cell sites 121 and 122 and a baseband unit (BBU) pool 126. In a cloud RAN, radio frequency (RF) components, referred to as remote radio heads (RRHs) or radio units (RUs), may be deployed remotely from baseband units, e.g., atop cell site masts, buildings, and so forth. In one example, the BBU pool 126 may be located at distances as far as 20-80 kilometers or more away from the antennas/remote radio heads of cell sites 121 and 122 that are serviced by the BBU pool 126. It should also be noted in accordance with efforts to migrate to 5G networks, cell sites may be deployed with new antenna and radio infrastructures such as MIMO antennas, and millimeter wave antennas.

Although cloud RAN infrastructure may include distributed RRHs and centralized baseband units, a heterogeneous network may include cell sites where RRH and BBU components remain co-located at the cell site. For instance, cell site 123 may include RRH and BBU components. Thus, cell site 123 may comprise a self-contained "base station." With regard to cell sites 121 and 122, the "base stations" may comprise RRHs at cell sites 121 and 122 coupled with respective baseband units of BBU pool 126.

Figure 3:
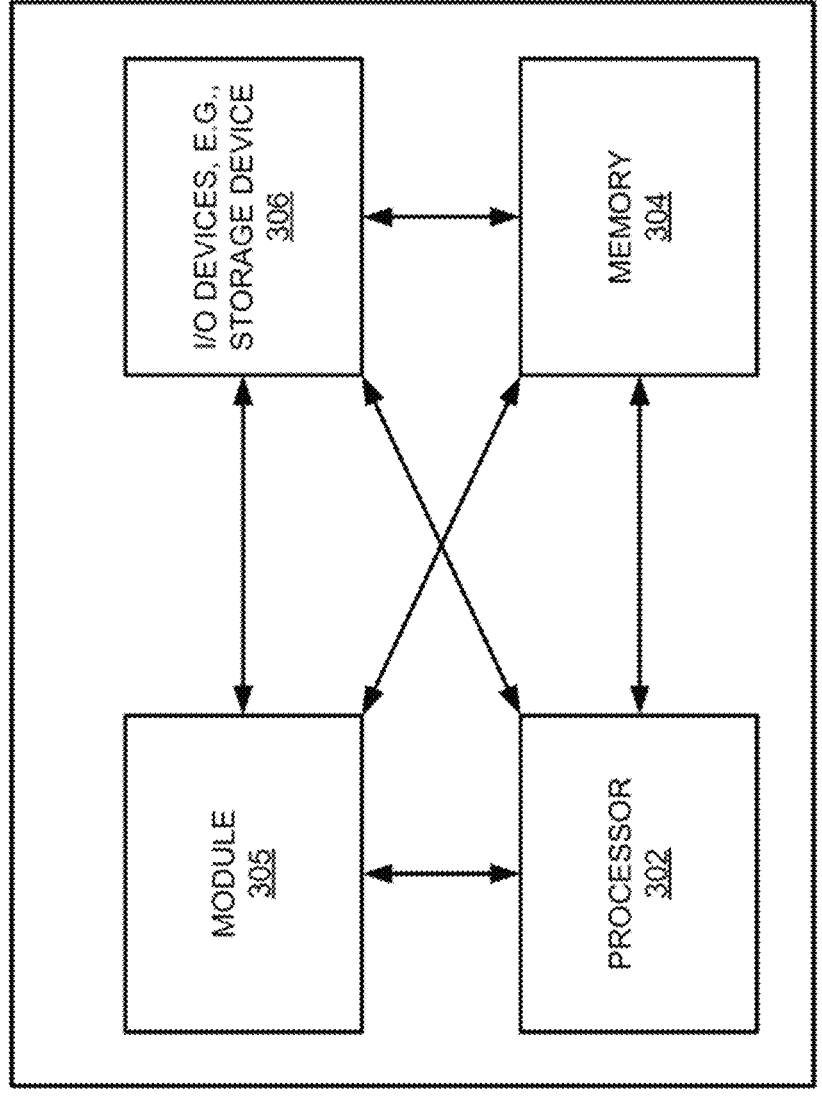
FIG. 3 depicts a high-level block diagram of a computing device specifically programmed to perform the functions described herein.

In accordance with the present disclosure, any one or more of cell sites 121-123 may be deployed with antenna and radio infrastructures, including MIMO and millimeter wave antennas. Furthermore, in accordance with the present disclosure, a base station (e.g., cell sites 121-123 and/or baseband units within BBU pool 126) may comprise all or a portion of a computing system, such as computing system 300 as depicted in FIG. 3, and may be configured to perform steps, functions, and/or operations in connection with examples of the present disclosure for exposing network key performance indicators to external clients via application programming interfaces.

In one example, access network 120 may include both 4G/LTE and 5G/NR radio access network infrastructure. For example, access network 120 may include cell site 124, which may comprise 4G/LTE base station equipment, e.g., an eNodeB. In addition, access network 120 may include cell sites comprising both 4G and 5G base station equipment, e.g., respective antennas, feed networks, baseband equipment, and so forth. For instance, cell site 123 may include both 4G and 5G base station equipment and corresponding connections to 4G and 5G components in cellular core network 130. Although access network 120 is illustrated as including both 4G and 5G components, in another example, 4G and 5G components may be considered to be contained within different access networks. Nevertheless, such different access networks may have a same wireless coverage area, or fully or partially overlapping coverage areas.

In one example, the cellular core network 130 provides various functions that support wireless services in the LTE environment. In one example, cellular core network 130 is an Internet Protocol (IP) packet core network that supports both real-time and non-real-time service delivery across a LTE network, e.g., as specified by the 3GPP standards. In one example, cell sites 121 and 122 in the access network 120 are in communication with the cellular core network 130 via baseband units in BBU pool 126.

In cellular core network 130, network nodes such as Mobility Management Entity (MME) 131 and Serving Gateway (SGW) 132 support various functions as part of the cellular network 110. For example, MME 131 is the control node for LTE access network components, e.g., eNodeB aspects of cell sites 121-123. In one embodiment, MME 131 is responsible for UE (User Equipment) tracking and paging (e.g., such as retransmissions), bearer activation and deactivation process, selection of the SGW, and authentication of a user. In one embodiment, SGW 132 routes and forwards user data packets, while also acting as the mobility anchor for the user plane during inter-cell handovers and as an anchor for mobility between 5G, LTE and other wireless technologies, such as 2G and 3G wireless networks.

In addition, cellular core network 130 may comprise a Home Subscriber Server (HSS) 133 that contains subscription-related information (e.g., subscriber profiles), performs authentication and authorization of a wireless service user, and provides information about the subscriber's location. The cellular core network 130 may also comprise a packet data network (PDN) gateway (PGW) 134 which serves as a gateway that provides access between the cellular core network 130 and various packet data networks (PDNs), e.g., service network 140, IMS network 150, other network(s) 180, and the like.

The foregoing describes long term evolution (LTE) cellular core network components (e.g., EPC components). In accordance with the present disclosure, cellular core network 130 may further include other types of wireless network components e.g., 5G network components, 3G network components, etc. Thus, cellular core network 130 may comprise an integrated network, e.g., including any two or more of 2G-5G infrastructures and technologies (or any future infrastructures and technologies to be deployed, e.g., 6G), and the like. For example, as illustrated in FIG. 1, cellular core network 130 further comprises 5G components, including: an access and mobility management function (AMF) 135, a network slice selection function (NSSF) 136, a session management function (SMF) 137, a unified data management function (UDM) 138, and a user plane function (UPF) 139.

In one example, AMF 135 may perform registration management, connection management, endpoint device reachability management, mobility management, access authentication and authorization, security anchoring, security context management, coordination with non-5G components, e.g., MME 131, and so forth. NSSF 136 may select a network slice or network slices to serve an endpoint device, or may indicate one or more network slices that are permitted to be selected to serve an endpoint device. For instance, in one example, AMF 135 may query NSSF 136 for one or more network slices in response to a request from an endpoint device to establish a session to communicate with a PDN. The NSSF 136 may provide the selection to AMF 135, or may provide one or more permitted network slices to AMF 135, where AMF 135 may select the network slice from among the choices. A network slice may comprise a set of cellular network components, such as AMF(s), SMF(s), UPF(s), and so forth that may be arranged into different network slices which may logically be considered to be separate cellular networks. In one example, different network slices may be preferentially utilized for different types of services. For instance, a first network slice may be utilized for sensor data communications, Internet of Things (IoT), and machine-type communication (MTC), a second network slice may be used for streaming video services, a third network slice may be utilized for voice calling, a fourth network slice may be used for gaming services, and so forth.

In one example, SMF 137 may perform endpoint device IP address management, UPF selection, UPF configuration for endpoint device traffic routing to an external packet data network (PDN), charging data collection, quality of service (QoS) enforcement, and so forth. UDM 138 may perform user identification, credential processing, access authorization, registration management, mobility management, subscription management, and so forth. As illustrated in FIG. 1, UDM 138 may be tightly coupled to HSS 133. For instance, UDM 138 and HSS 133 may be co-located on a single host device, or may share a same processing system comprising one or more host devices. In one example, UDM 138 and HSS 133 may comprise interfaces for accessing the same or substantially similar information stored in a database on a same shared device or one or more different devices, such as subscription information, endpoint device capability information, endpoint device location information, and so forth. For instance, in one example, UDM 138 and HSS 133 may both access subscription information or the like that is stored in a unified data repository (UDR) (not shown).

UPF 139 may provide an interconnection point to one or more external packet data networks (PDN(s)) and perform packet routing and forwarding, QoS enforcement, traffic shaping, packet inspection, and so forth. In one example, UPF 139 may also comprise a mobility anchor point for 4G-to-5G and 5G-to-4G session transfers. In this regard, it should be noted that UPF 139 and PGW 134 may provide the same or substantially similar functions, and in one example, may comprise the same device, or may share a same processing system comprising one or more host devices.

It should be noted that other examples may comprise a cellular network with a "non-stand alone" (NSA) mode architecture where 5G radio access network components, such as a "new radio" (NR), "gNodeB" (or "gNB"), and so forth are supported by a 4G/LTE core network (e.g., an EPC network), or a 5G "standalone" (SA) mode point-to-point or service-based architecture where components and functions of an EPC network are replaced by a 5G core network (e.g., a "5GC"). For instance, in non-standalone (NSA) mode architecture, LTE radio equipment may continue to be used for cell signaling and management communications, while user data may rely upon a 5G new radio (NR), including millimeter wave communications, for example. However, examples of the present disclosure may also relate to a hybrid, or integrated 4G/LTE-5G cellular core network such as cellular core network 130 illustrated in FIG. 1. In this regard, FIG. 1 illustrates a connection between AMF 135 and MME 131, e.g., an "N26" interface which may convey signaling between AMF 135 and MME 131 relating to endpoint device tracking as endpoint devices are served via 4G or 5G components, respectively, signaling relating to handovers between 4G and 5G components, and so forth.

In one example, service network 140 may comprise one or more devices for providing services to subscribers, customers, and/or users. For example, communication service provider network 101 may provide a cloud storage service, web server hosting, and other services. As such, service network 140 may represent aspects of communication service provider network 101 where infrastructure for supporting such services may be deployed. In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general. In this regard, it should be noted that any one or more of service network 140, other networks 180, or IMS network 150 may comprise a packet data network (PDN) to which an endpoint device may establish a connection via cellular core network 130 in accordance with the present disclosure.

In one example, any one or more of the components of cellular core network 130 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 131 may comprise a vMME, SGW 132 may comprise a vSGW, and so forth. Similarly, AMF 135, NSSF 136, SMF 137, UDM 138, and/or UPF 139 may also comprise NFVI configured to operate as VNFs. In addition, when comprised of various NFVI, the cellular core network 130 may be expanded (or contracted) to include more or less components than the state of cellular core network 130 that is illustrated in FIG. 1. It should be noted that intermediate devices and links between MME 131, SGW 132, cell sites 121-124, PGW 134, AMF 135, NSSF 136, SMF 137, UDM 138, and/or UPF 139, and other components of system 100 are also omitted for clarity, such as additional routers, switches, gateways, and the like.

FIG. 1 also illustrates various endpoint devices, e.g., user equipment (UE) 104 and 106. Each of the UEs 104 and 106 may comprise a cellular telephone, a smartphone, a tablet computing device, a laptop computer, a pair of computing glasses, a wireless enabled wristwatch, a wireless transceiver for a fixed wireless broadband (FWB) deployment, an item of customer premises equipment, or any other cellular-capable mobile telephony and computing device (broadly, "an endpoint device"). For instance, each of the UEs 104 and 106 may include one or more radio frequency (RF) transceivers for cellular communications and/or for non-cellular wireless communications. In one example, each of the UEs 104 and 106 may be equipped with one or more directional antennas, or antenna arrays (e.g., having a half-power azimuthal beamwidth of 120 degrees or less, 90 degrees or less, 60 degrees or less, etc.), e.g., MIMO antenna(s) to receive and/or to transmit multi-path and/or spatial diversity signals.

In one example, each of the UEs 104 and 106 may comprise all or a portion of a computing system, such as computing system 300 depicted in FIG. 3, and may be configured to perform steps, functions, and/or operations in connection with examples of the present disclosure for exposing network key performance indicators to external clients via application programming interfaces. In this regard, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

As illustrated in FIG. 1, UE 104 may access wireless services via the cell site 121 (e.g., NR alone, where cell site 121 comprises a gNB), while UE 106 may access wireless services via any of the cell sites 121-124 located in the access network 120 (e.g., for NR non-dual connectivity, for LTE non-dual connectivity, for NR-NR DC, for LTE-LTE DC, for EN-DC, and/or for NE-DC). For instance, in one example, UE 106 may establish and maintain connections to the cellular core network 130 via one or multiple gNBs (e.g., cell sites 121 and 122 and/or cell sites 121 and 122 in conjunction with BBU pool 126 and/or various other components, such as a CU and/or a DU). In another example, UE 106 may establish and maintain connections to the cellular core network 130 via a gNB (e.g., cell site 122 and/or cell site 122 in conjunction with BBU pool 126) and an eNodeB (e.g., cell site 124), respectively. In addition, either the gNB or the eNodeB may comprise a PCell, and the other may comprise a SCell for carrier aggregation and/or dual connectivity. Similarly, UE 106 may communicate with any of the cell sites 121 and 122 using carrier aggregation (CA) (e.g., in accordance with a CA technique). Furthermore, either or both of NR/5G and or EPC (4G/LTE) core network components may manage the communications between UE 106 and the cellular network 110 via cell site 122 and cell site 124.

In one example, the cellular core network 130 may further include an application server (AS) 195, which may comprise a computing system or server, such as computing system 300 depicted in FIG. 3, and may be configured to provide one or more operations or functions in connection with examples of the present disclosure for exposing network key performance indicators to external clients via application programming interfaces. The cellular core network 130 may also include a database (DB) 197 that is communicatively coupled to the AS 195.

The AS 195 may comprise one or more physical devices, e.g., one or more computing systems or servers, such as computing system 300 depicted in FIG. 3, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

In one example, the AS 195 may be configured to estimate KPIs for one or more segments of the communication service provider network 101 and to publish those KPIs, via a stack of APIs, to various external clients of the communication service provider network 101. In one example, the KPIs may be estimated with varying granularity, which may be dictated by the operator of the communication service provider network 101 or by the external clients. For instance, the AS 195 may estimate KPIs per UE 104 or 106, per application executing on UEs 104 and 106, per cell site 121-124, for the access network as a whole per period of time (e.g., per hour, per two hours, etc.), or according to any other granularities.

The stack of APIs may allow the AS 195 to customize the KPIs that are presented to different external clients. For instance, all external clients may be assigned different credentials via which to access an API gateway. Via the API gateway, each external client may manage the KPIs that they wish to view, and the granularity with which they wish for the KPIs to be estimated. The type and granularity of the KPIs may be managed through configuration of settings in the API gateway or through selection of search criteria via a search function of the API gateway.

The KPIs may be estimated based on analytics from various sources, such as flow cytometry analysis programs, event data records from an LTE network, event data records from a 5G standalone network or 5G non-standalone network, speed test platforms, and/or other sources. In a further example, the KPIs may include KPIs that are estimated by mapping network performance metrics computed by the external clients into more "standardized" KPIs. For instance, the AS 195 may convert speed test data for a specific application and location into more general uplink and/or downlink throughput measures. In one example, the AS 195 may use machine learning to learn correlations or mappings between external client measured performance metrics and KPIs.

The DB 197 may store analytics from various sources, such as flow cytometry analysis programs, event data records from an LTE network, event data records from a 5G standalone network or 5G non-standalone network, speed test platforms, and/or other sources, which may be used by the AS 195 to estimate KPIs. The DB 197 may also preferences for various external clients of the communication service provider network 101, where the preferences may guide the AS 195 to filter the KPIs that are presented to various external clients according to type, granularity, and/or other criteria. For instance, the set of KPIs presented to one external client may not be the same as the set of KPIs presented to another external client. Different external clients may have different preferences relating to the types of KPI data they wish to receive, based on the different needs of the external clients. For instance, the types and/or granularity of KPIs that are useful to a manufacturer of autonomous vehicles may be different from the types and/or granularity of KPIs that are useful to a developer of a streaming video application.

In one example, the DB 197 may comprise a physical storage device integrated with the AS 195 (e.g., a database server or a file server), or attached or coupled to the AS 195, in accordance with the present disclosure. In one example, the AS 195 may load instructions into a memory, or one or more distributed memory units, and execute the instructions for exposing network key performance indicators to external clients via application programming interfaces, as described herein. An example method for exposing network key performance indicators to external clients via application programming interfaces is described in greater detail below in connection with FIG. 2.

In one example, the cellular core network 130 may include multiple instances of the AS 195 and DB 197 distributed throughout the cellular core network 130, where the multiple instances each store identical data for the purposes of redundancy.

The foregoing description of the system 100 is provided as an illustrative example only. In other words, the example of system 100 is merely illustrative of one network configuration that is suitable for implementing examples of the present disclosure. As such, other logical and/or physical arrangements for the system 100 may be implemented in accordance with the present disclosure. For example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For instance, in one example, the cellular core network 130 may further include a Diameter routing agent (DRA) which may be engaged in the proper routing of messages between other elements within cellular core network 130, and with other components of the system 100, such as a call session control function (CSCF) (not shown) in IMS network 150. In another example, the NSSF 136 may be integrated within the AMF 135. In addition, cellular core network 130 may also include additional 5G NG core components, such as: a policy control function (PCF), an authentication server function (AUSF), a network repository function (NRF), and other application functions (AFs). In one example, any one or more of the cell sites 121-124 may comprise 2G, 3G, 4G and/or LTE radios, e.g., in addition to 5G new radio (NR), or gNB functionality, or any future cellular technology, e.g., 6G and so on. For instance, cell site 123 is illustrated as being in communication with AMF 135 in addition to MME 131 and SGW 132. Thus, these and other modifications are all contemplated within the scope of the present disclosure.

To further aid in understanding the present disclosure, FIG. 2 illustrates a flowchart of an example method 200 for exposing network key performance indicators to external clients via application programming interfaces, in accordance with the present disclosure. In one example, the method 200 may be performed by an application server that is configured to calculate key performance indicators and to convert performance metrics computed by external clients into key performance indicators such as the AS 195 illustrated in FIG. 1. However, in other examples, the method 200 may be performed by another device, such as the processor 302 of the system 300 illustrated in FIG. 3. For the sake of example, the method 200 is described as being performed by a processing system.

The method 200 begins in step 202. In step 204, the processing system may calculate a first set of key performance indicators for a communications network based on data acquired from at least one source that is accessible to an operator of the communications network. In one example, the communications network may comprise at least one of: an Internet service provider network, a telecommunications service provider core network, or a cellular access network (e.g., a 5G network or beyond 5G network, an LTE network, or the like). In a further example, however, the communications network may be another type of communications network. The first set of key performance metrics may be calculated for one or more specific segments of the communications network. For instance the first set of key performance metrics may be calculated end-to-end, within the RAN, or for other segments of the communications network.

In one example, the first set of key performance indicators may comprise one or more metrics that are internally measured and calculated by the operator of the communications network in order to ensure that the performance of the communications network is meeting customer expectations. For instance, the first set of key performance indicators may include at least one of: bandwidth usage, latency, packet loss, jitter, uplink throughput, downlink throughput, or another KPI.

In one example, the first set of key performance indicators may be calculated based on data from at least one source that is accessible to the operator of the communications network, but may not be accessible to an external client of the communications network (where an external client of the communications network may be an application developer, a manufacturer of autonomous vehicles or Internet of Things devices, an extended reality application system, or the like). The at least one source may include at least one of: a flow cytometry analysis program, an event data record from an LTE network, an event data record from a 5G standalone network or 5G non-standalone network, a speed test platform, or another source.

In one example, the first set of key performance indicators may be calculated with a granularity that is selected by an external client of the communications network. For instance, the first set of key performance indicators may be calculated per cell of the communications network, per application running in the communications network, per hour (e.g., as an aggregate over all network traffic traversing the communications network over the hour), per user of the communications network, per market of the communications network (where the market may correspond to a geographic area served by the communications network, a customer subset served by the communications network, or the like), or according to another granularity. In another example, the operator of the communications network may specify the granularity with which the first set of key performance indicators is calculated. The operator may also elect to compute the first set of key performance indicators according to more than one granularity.

In optional step 206 (illustrated in phantom), the processing system may acquire a set of performance metrics for the communications network that were calculated by an external client of the communications network. As discussed above, external clients of communications networks may compute and monitor their own measures of network performance, independent of the KPIs calculated by the operators of the communications networks. For instance, an autonomous car manufacturer may collect speed test data for a particular geographic location (e.g., within a town, a city, etc.). However, this speed test data may provide a limited view of network performance that is pertinent to only one application. In other words, the speed test data observed by the autonomous car manufacturer may not apply for other applications such as streaming media, web browsing, gaming, or the like. Moreover, the autonomous car manufacturer may have no way of translating the results of the speed test into more broadly applicable measures of network performance (such as throughput, latency, packet loss, jitter, or the like). Other network performance metrics that may be calculated by an external client may include at least one of: latency of an application (e.g., an application executing on a user endpoint device), device (e.g., user endpoint device), or customer (e.g., customer of the external client, which may be an individual, an enterprise, or the like); downlink throughput of an application, device, or customer; uplink throughput of an application, device, or customer; or packet loss of an application, device, or customer. Thus, the external client may measure many of the same metrics that the operator of the communications measures, but on a more granular or localized (e.g., application, device, or customer) level because the external client does not have the more global view of the communications network that the operator has.

In optional step 208 (illustrated in phantom), the processing system may calculate a second set of key performance indicators for the communications network by executing a machine learning model that is trained to map the set of performance metrics into the second set of key performance indicators. In one example, the machine learning model may be trained using a set of test data that comprises observed historical key performance indicators for the communications network and historical performance metrics for the communications network that were observed by external clients of the communications network. The machine learning model may learn mappings between KPIs and external client-measured performance metrics. Thus, once trained, the machine learning model may be provided with client-measured performance metrics as inputs and may generate as output predicted KPIs that correspond to the client-measured performance metrics. In one example, the machine learning model may comprise at least one of: a decision tree, a regression model, a neural network, or a support vector machine.

There are many instances in which it may be beneficial to convert external client-measured performance metrics to KPIs of the type that are calculated by the operator of the communications network. For example, an external client who develops extended reality gaming applications may wish to understand what their customers' experiences with latency are within a specific geographic area (e.g., a market, a city, a zone, a RAN cell, an eNodeB, etc.). However, the RAN operator may be the only source of real time ground data for a use case of this nature. As another example, an external client may have speed test data that provides a view of the speed of a network connection between a specific device and a test server in the communications network, but the speed may vary widely for other devices and applications in the communications network.

In step 210, the processing system may publish at least the first set of key performance indicators via an application programming interface that enables an operator of the communications network to share data with the external client of the communications network. In one example, where the processing system has received a set of performance metrics from the external client and mapped the set of performance metrics to a second set of key performance metrics, the processing system may also publish the second set of key performance metrics via the API in step 210.

In one example, the API may be provided as part of a paid service that the operator of the communications network provides to the external client. By providing the external client with the first and/or second set of KPIs, the external client may have greater visibility into network performance and what the set of performance metrics measured by the external client may mean in terms of real network throughput, latency, or the like in the RAN, end-to-end, or the like. This improved visibility may allow the external client to optimize the design of applications and services (including features of the applications and services) that rely on connectivity to the communications network.

In one example, step 210 may include customizing the presentation of the first and/or second set of key performance indicators to the external client in accordance with a preference of the external client. Preferences of the external client may be obtained through configurable settings or through a search function (e.g., via which the external client may specify criteria for filtering the first and/or second set of key performance indicators for specific locations, KPIs, devices, users, or the like). Thus, the processing system may generate different sets of KPIs for presentation to different external clients, based on the preferences of the different external clients; the set of KPIs presented to one external client may be different from the set of KPIs presented to another external client.

In one example, the API may be one API in a stack of APIs that allow the operator of the communications network to share data with the external client. For instance, the stack of APIs may include one or more systems APIs which acquire analytics from various data sources, one or more process APIs that provide business logic and customization for customizing selection and presentation of the analytics for specific external clients, and an API gateway for exposing the customized analytics to the client interfaces of the specific external clients. In this case, each external client may have a respective set of credentials that each external client can use to log into the API gateway (e.g., via a web portal or a standalone application).

In step 212, the method 200 may end.

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the examples of the present disclosure.

FIG. 3 depicts a high-level block diagram of a computing device specifically programmed to perform the functions described herein. For example, any one or more components or devices illustrated in FIG. 1 or described in connection with the method 200 may be implemented as the system 300. For instance, an application server (such as might be used to perform the method 200) could be implemented as illustrated in FIG. 3.

As depicted in FIG. 3, the system 300 comprises a hardware processor element 302, a memory 304, a module 305 for exposing network key performance indicators to external clients via application programming interfaces, and various input/output (I/O) devices 306.

The hardware processor 302 may comprise, for example, a microprocessor, a central processing unit (CPU), or the like. The memory 304 may comprise, for example, random access memory (RAM), read only memory (ROM), a disk drive, an optical drive, a magnetic drive, and/or a Universal Serial Bus (USB) drive. The module 305 for exposing network key performance indicators to external clients via application programming interfaces may include circuitry and/or logic for computing key performance indicators and for converting network performance metrics measured by external client applications or services into key performance indicators. The input/output devices 306 may include, for example, a camera, a video camera, storage devices (including but not limited to, a tape drive, a floppy drive, a hard disk drive or a compact disk drive), a receiver, a transmitter, a speaker, a display, a speech synthesizer, an output port, and a user input device (such as a keyboard, a keypad, a mouse, and the like), or a sensor.

Although only one processor element is shown, it should be noted that the computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for exposing network key performance indicators to external clients via application programming interfaces (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for exposing network key performance indicators to external clients via application programming interfaces (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:

calculating, by a processing system including at least one processor, a first set of key performance indicators for a communications network based on data acquired from at least one source that is accessible to an operator of the communications network, wherein the communications network comprises at least one of: an Internet service provider network, a telecommunications service provider core network, or a cellular access network;

acquiring, by the processing system, a set of performance metrics for the communications network that were calculated by the external client of the communications network;

calculating, by the processing system, a second set of key performance indicators for the communications network by executing a machine learning model that is trained to map the set of performance metrics into the second set of key performance indicators; and publishing, by the processing system, at least the first set of key performance indicators via an application programming interface that enables the operator of the communications network to share data with an external client of the communications network, wherein the publishing further comprises publishing the second set of key performance indicators via the application programming interface.

2. The method of claim 1, wherein the first set of key performance indicators includes at least one of: a bandwidth usage indicator, a latency indicator, a packet loss indicator, a jitter indicator, an uplink throughput indicator, or a downlink throughput indicator.

3. The method of claim 1, wherein the first set of key performance indicators comprises a set of metrics that is calculated based on data from the at least one source that is accessible to the operator of the communications network, but not accessible to the external client of the communications network.

4. The method of claim 3, wherein the at least one source comprises at least one of: a flow cytometry analysis program, an event data record from a long term evolution network, an event data record from a fifth generation standalone network, an event data record from a fifth generation non-standalone network, or a speed test platform.

5. The method of claim 1, wherein the external client of the communications network is at least one of: an application developer, a manufacturer of autonomous vehicles, a manufacturer of internet of things devices, or an extended reality application system.

6. The method of claim 1, wherein the first set of key performance indicators is calculated with a granularity that is at least one of: per cell of the communications network, per application running in the communications network, per hour, per user of the communications network, or per market of the communications network.

7. The method of claim 6, wherein the granularity is selected by the external client of the communications network.

8. The method of claim 6, wherein the granularity is selected by the operator of the communications network.

9. The method of claim 1, wherein the application programming interface is one application programming interface in a stack of application programming interfaces that allows the operator of the communications network to share data with the external client of the communications network.

10. The method of claim 9, wherein the stack of application programming interfaces comprises:

at least one systems application programming interface which acquires analytics related to the first set of key performance indicators from various data sources;

at least one process application programming interface that provides business logic and customization for customizing a selection and a presentation of the analytics for the external client of the communications network to generate customized analytics; and an application programming interface gateway for exposing the customized analytics to a client interface of the external client of the communications network.

11. The method of claim 1, wherein the publishing includes customizing a presentation of the first set of key performance indicators to the external client of the communications network in accordance with a preference of the external client of the communications network.

12. The method of claim 11, wherein the preference of the external client of the communications network is obtained through at least one of: a configurable setting or a search function.

13. The method of claim 1, wherein the set of performance metrics includes at least one of: speed test data for a particular geographic location, latency data for an application, latency data for a device, latency data for a customer, downlink throughput data for the application, downlink throughput data for the device, downlink throughput data for the customer, uplink throughput data for the application, uplink throughput data for the device, uplink throughput data for the customer, packet loss data for the application, packet loss data for the device, or packet loss data for the customer.

14. The method of claim 1 wherein the machine learning model comprises at least one of: a decision tree, a regression model, a neural network, or a support vector machine.

15. The method of claim 1, wherein the set of performance metrics is calculated independently of the first set of key performance indicators.

16. The method of claim 1, wherein the first set of key performance indicators comprises a set of key performance indicators that the external client of the communications network has requested, and wherein the calculating and the publishing are repeated for a different set of key performance indicators requested by a different external client of the communications network.

17. A non-transitory computer-readable medium storing instructions which, when executed by a processing system including at least one processor, cause the processing system to perform operations, the operations comprising:

calculating a first set of key performance indicators for a communications network based on data acquired from at least one source that is accessible to an operator of the communications network, wherein the communications network comprises at least one of: an Internet service provider network, a telecommunications service provider core network, or a cellular access network;

acquiring a set of performance metrics for the communications network that were calculated by the external client of the communications network;

calculating a second set of key performance indicators for the communications network by executing a machine learning model that is trained to map the set of performance metrics into the second set of key performance indicators; and publishing at least the first set of key performance indicators via an application programming interface that enables the operator of the communications network to share data with an external client of the communications network, wherein the publishing further comprises publishing the second set of key performance indicators via the application programming interface.

18. A device comprising:

a processing system including at least one processor; and a computer-readable medium storing instructions which, when executed by the processing system, cause the processing system to perform operations, the operations comprising:

calculating a first set of key performance indicators for a communications network based on data acquired from at least one source that is accessible to an operator of the communications network, wherein the communications network comprises at least one of: an Internet service provider network, a telecommunications service provider core network, or a cellular access network;

acquiring a set of performance metrics for the communications network that were calculated by the external client of the communications network;

calculating a second set of key performance indicators for the communications network by executing a machine learning model that is trained to map the set of performance metrics into the second set of key performance indicators; and publishing at least the first set of key performance indicators via an application programming interface that enables the operator of the communications network to share data with an external client of the communications network, wherein the publishing further comprises publishing the second set of key performance indicators via the application programming interface.

19. The device of claim 18, wherein the first set of key performance indicators includes at least one of: a bandwidth usage indicator, a latency indicator, a packet loss indicator, a jitter indicator, an uplink throughput indicator, or a downlink throughput indicator.

20. The device of claim 18, wherein the first set of key performance indicators comprises a set of metrics that is calculated based on data from the at least one source that is accessible to the operator of the communications network, but not accessible to the external client of the communications network.

* * * * *